(12) United States Patent
Webster

(10) Patent No.: US 6,201,368 B1
(45) Date of Patent: Mar. 13, 2001

(54) SWITCHED RELUCTANCE DRIVE WITH HIGH POWER FACTOR

(75) Inventor: Paul D. Webster, Harrogate (GB)

(73) Assignee: Switched Reluctance Drives Limited, Harrogate (GB)

( * ) Notice: Subject to any disclaimer, the term of this patent is extended or adjusted under 35 U.S.C. 154(b) by 0 days.

(21) Appl. No.: 09/385,772

(22) Filed: Aug. 30, 1999

(30) Foreign Application Priority Data

Aug. 28, 1998 (GB) .................................................. 9818878

(51) Int. Cl.⁷ ....................................................... H02P 5/28
(52) U.S. Cl. ............................ 318/729; 318/701; 318/254
(58) Field of Search ................................... 318/701, 729, 318/254

(56) References Cited

U.S. PATENT DOCUMENTS

| | | | |
|---|---|---|---|
| 5,138,244 | 8/1992 | Bahn | 318/701 |
| 5,828,195 | * 10/1998 | Zalesski | 318/366 |
| 5,994,869 | * 11/1999 | Becerra | 318/729 |
| 6,014,001 | * 1/2000 | Guinet | 318/701 |
| 6,014,002 | * 1/2000 | Guinet | 318/701 |

FOREIGN PATENT DOCUMENTS

| | | |
|---|---|---|
| 0 573 198 A1 | 12/1993 | (EP) . |
| 0 602 908 A1 | 6/1994 | (EP) . |
| 0 805 548 A2 | 11/1997 | (EP) . |

OTHER PUBLICATIONS

Abstract of JP 2123998, published May 11, 1990.
"The Characteristics, Design and Applications of Switched Reluctance Motors and Drives", by J.M. Stephenson et al., PCIM '93 Conference & Exhibition, Seminar 5, Nurnberg, Germany, Jun. 21–24, 1993, pp. 1–68.
Sum, K. Kit, "Improved Valley–Fill Passive Power Factor Correction Current Shaper Approaches IEC Specification Limits", PCIM, Feb. 1998, pp. 42–51.
Spangler, James., "A Power Factor Corrected, MOSFET, Multiple Output, Flyback Switching Supply", PCI, Oct. 1985 Proceedings, pp. 19–32.

* cited by examiner

Primary Examiner—Robert E. Nappi
Assistant Examiner—Rita Leykin
(74) Attorney, Agent, or Firm—Dicke, Billig & Czaja, P.A.

(57) ABSTRACT

A polyphase switched reluctance drive is supplied from a passive power factor correction circuit. The phases of the machine are switched so that there is substantially always one phase drawing current from the DC link and the current drawn from the DC link is substantially always positive. Embodiments of the invention provide a cost-effective, high-power, switched reluctance drive system that draws power at a high power factor from the supply. Corresponding methods provide similar advantages.

13 Claims, 7 Drawing Sheets

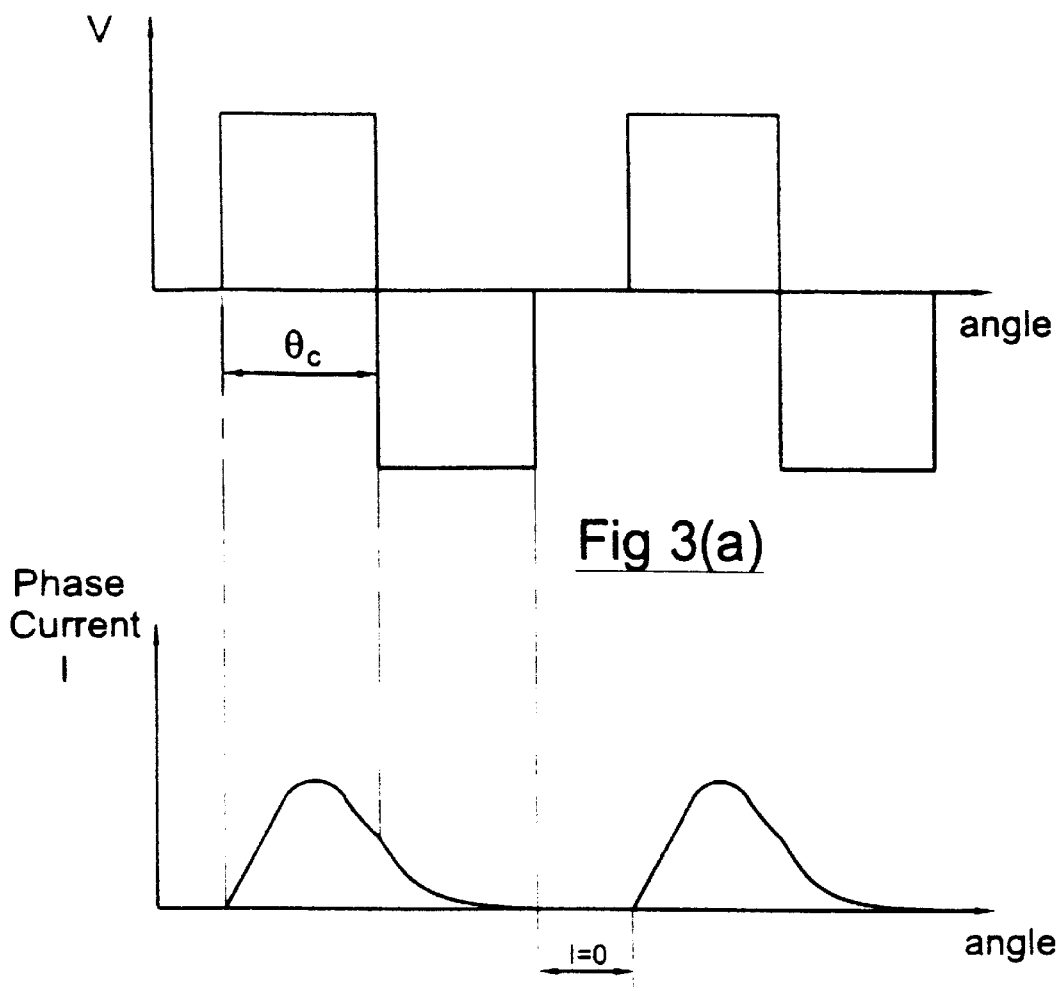
Fig 3(a)
Fig 3(b)
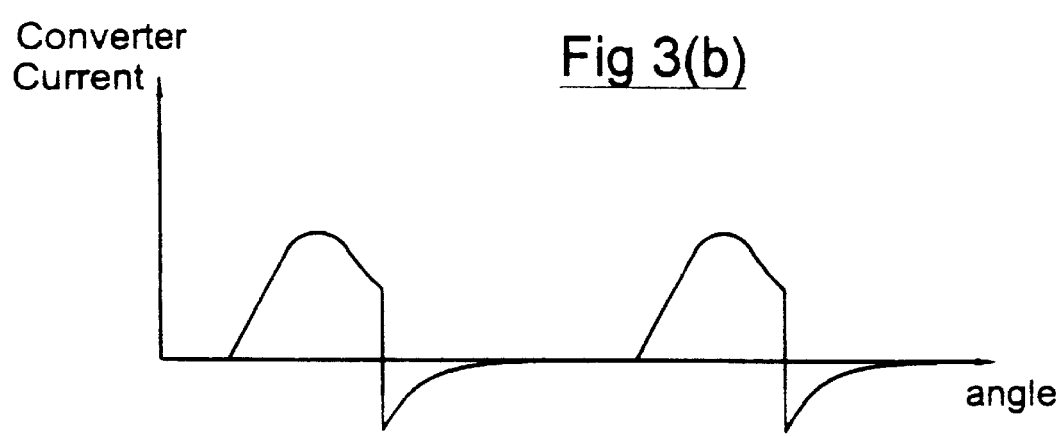
Fig 3(c)

SWITCHED RELUCTANCE DRIVE WITH HIGH POWER FACTOR

BACKGROUND OF THE INVENTION

1. Field of the Invention

This invention relates to a switched reluctance drive system. In particular, it relates to a switched reluctance drive system that is configured to draw current at a high power factor from an electrical supply.

2. Description of Related Art

The characteristics and operation of switched reluctance machines are well known in the art and are described in, for example, "The Characteristics, Design and Application of Switched Reluctance Motors and Drives" by Stephenson and Blake, PCIM '93, Nürnberg, Jun. 21–24, 1993, which is incorporated herein by reference.

FIG. 1 shows a typical switched reluctance drive in schematic form arranged to drive a load 19. The drive comprises a switched reluctance motor 12 having a stator and a rotor, a power converter 13 and an electronic control unit 14. The drive is supplied from a DC power supply 11 that can be either a battery or rectified and filtered AC mains. The DC voltage provided by the power supply 11 is switched across phase windings 16 of the motor 12 by a power converter 13 under the control of the electronic control unit 14.

FIG. 2 shows typical switching circuitry in the power converter 13 that controls the energization of the phase winding 16. In this circuit, a switch 21 is connected between the positive terminal of a power line and one end of the winding 16. Connected between the other end of the winding 16 and the negative terminal of the power supply is another switch 22. Between switch 22 and the winding 16 is connected the anode of a diode 23, the cathode of which is connected to the positive line of the power supply. Between switch 21 and the winding 16 is connected the cathode of another diode 24, which is connected at its anode to the negative line of the power supply. Switches 21 and 22 act to couple and de-couple the phase winding 16 to the source of DC power, so that the winding 16 can be energized or de-energized.

Many other configurations of switching circuitry are known in the art, some of which are discussed in the Stephenson & Blake paper cited above.

For proper operation of the drive, the switching must be correctly synchronized to the angle of rotation of the rotor. A rotor position detector 15 is typically employed to supply signals corresponding to the angular position of the rotor. The output of the rotor position detector 15 may also be used to generate a speed feedback signal.

The rotor position detector 15 may take many forms. For example it may take the form of hardware, as shown schematically in FIG. 1, or of a software algorithm that calculates the position from other monitored parameters of the drive system, as described in e.g. European Patent Application No. EP-A-0573198 (Ray), incorporated herein by reference. In some systems, the rotor position detector 15 can comprise a rotor position transducer that provides output signals that change state each time the rotor rotates to a position where a different switching arrangement of the devices in the power converter 13 is required.

The switched reluctance drive is essentially a variable speed system characterized by voltages and currents in the phase windings 16 that are quite different from those found in traditional machines. FIG. 3(a) shows a typical voltage waveform applied by the controller to the phase winding 16. At a predetermined rotor angle, the voltage is applied by switching on the switches 21 and 22 in the power converter 13 and applying a constant voltage for a given conduction angle $\theta_c$. The current rises from zero, typically reaches a peak and falls slightly as shown in FIG. 3(b). When $\theta_c$ has been traversed, the switches in the power converter 13 are opened and the action of the energy return diodes 23 and 24 places a negative voltage across the winding, causing the flux in the machine, and hence the current, to decay to zero. There is then a period of zero current until the cycle is repeated. It will be clear that the phase draws energy from the supply during $\theta_c$ and returns a smaller amount to the supply thereafter. It follows that the supply, shown as 11 in FIG. 1, needs to be a low-impedance source that is capable of receiving returned energy for part of its operating cycle. FIG. 3(c) shows the current that is supplied to the phase winding 16 by the power converter 13 during the period of energy supply and the current that flows back to the converter 13 during the period of energy return.

Typically, the DC power supply 11 of FIG. 1 is realized by rectifying the AC mains supply, as shown in FIG. 4 where the mains supply 30 is shown as an AC voltage source 32 in series with a source impedance 34. In most cases, the impedance 34 is mainly inductive. This inductance can be increased by adding further inductive components in series. A rectifier bridge 36 is provided having four terminals A, B, C and D, two of which, A and C, are connected to the mains supply 30, the other two, B and D, being connected across a capacitor 38. The rectifier bridge 36 rectifies the sinusoidal voltage of the source and the output voltage is smoothed by the capacitor 38. Connected in parallel with the capacitor 38 and the rectifier bridge 36 is a switched reluctance drive 39 (shown schematically), typically comprising the blocks 12, 13 and 14 of FIG. 1.

The lines marked +V and −V in FIG. 4 are generally known as the DC link, and capacitor 38 as the DC link capacitor.

In the absence of any load on the DC link, the capacitor 38 is charged up by successive cycles of voltage to the peak voltage of the sinusoidal supply 30. The capacitor 38 must therefore be rated for at least the peak of the supply voltage. As resistive load is applied, and when the supply voltage is below the capacitor voltage, energy is drawn from the capacitor 38. When the rectified supply voltage rises above the capacitor voltage, the capacitor 38 is charged up.

The size of the capacitor 38 and the amount of current drawn by the load interact. Generally, the capacitor is sized so that there is a relatively small amount of droop on the DC link voltage while the capacitor is supplying the load. FIG. 5 shows the rectified voltage and the DC link voltage for a typically sized capacitor, from which it can be seen that the DC link voltage is held approximately constant. The shape of the current from the supply is complex, since it is dependent not only on the size of the DC link capacitor but also on the size and nature of the source impedance. If the capacitor 38 is very large (so that the voltage ripple is effectively zero) and the supply impedance is negligible, the plot of current vs time has a very large spike centered on the peak of a like plot of the rectified voltage waveform. In practice, some supply impedance is always present and has the effect of widening the width of the current pulse and hence reducing its magnitude. Nevertheless, the rectifier must be rated to carry the high peak current.

The general form of the supply current as a function of time is shown in FIG. 5, where it should be noted that the current is zero for a significant fraction of the overall cycle. This has an undesirable effect on the power factor of the overall circuit. Power factor is defined as the ratio of the real power supplied to the load to the apparent power (i.e. the volt-amperes) supplied to the circuit. With low supply impedance, the power factor is typically around 0.5. With inductance added to the supply it is possible to increase the width of the current pulse and hence increase the power factor, but a value of around 0.65 is generally considered to be the practical and cost-effective limit.

These low power factors can cause problems for the designers of electrical equipment, for two reasons. Firstly, the supply may have a minimum limit on the power factor that can be drawn, in which case the power factor has to be corrected by some other means. Secondly, for appliances operating from domestic power supply outlets, there is a fixed current limit: for example in the US, domestic supplies are often limited to 15A at 120V. This allows a nominal power of 1800W to be drawn at unity power factor, but proportionally less at reduced power factors (typically 1000W using the circuit of FIG. 4). For these reasons, power factor correction (PFC) circuits have been developed to raise the power factor of a given load. European Patent Application No. EP-A-0805548 (Sugden), incorporated herein by reference, describes various active power factor correction circuits. These are known as "active" circuits because they typically use a switch placed across the output of the rectifier to modulate the current drawn from the supply and force it to follow the phase and waveshape of the supply voltage. However, while these circuits can greatly improve the power factor, they are expensive and bulky. A cheaper and smaller circuit is required, particularly for domestic appliances.

In addition to active PFC circuits, passive PFC circuits are known. These do not use active switches but employ combinations of passive components to improve the power factor. One such circuit is described in "Improved Valley-Fill Passive Power Factor Correction Current Shaper Approaches IEC Specification Limits", PCIM Journal, Feb. 1998, pp. 42–51, Sum, KK, which is incorporated herein by reference. This circuit is shown in FIG. 6, and includes the supply 30 and rectifier bridge 36 described with reference to FIG. 4. However, in this case, connected across terminals B and D of the rectifier bridge 36, there is a series combination comprising a capacitor C1 connected to the anode of a diode D3 that is connected via its cathode to another capacitor C2. Connected between capacitor C1 and diode D3 is the cathode of another diode D1, the anode of which is connected to the −V line of the DC link. Connected between capacitor C2 and diode D3 is the anode of yet another diode D2, the cathode of which is connected to the +V line of the DC link.

When the supply voltage of the circuit of FIG. 6 reaches its peak value, charging current is able to flow through rectifier 36 into the series connection of C1, D3 and C2. The capacitors are each rated at half the peak of the rectified voltage. When a resistive load R1 is applied, the action of D1 and D2 is to connect C1 and C2 in parallel, so that when the rectified voltage falls to half its peak value, the load is supplied from the two capacitors. When the rectified voltage is above half its peak value, the load is supplied directly from the rectifier. FIG. 7 shows the voltage waveforms. The circuit thus fills in part of the trough or valley between the pulses of voltage, hence the name "valley-fill".

Assuming that the capacitors are fully charged by the peak portion of the voltage, they start to supply current when the supply voltage falls to half its peak, i.e. at 150°. Neglecting any droop in the capacitor voltage, they cease to supply current at the next value of half peak voltage, i.e. at 30°, when D1 and D2 become reverse biased. Between these angles, the current for the load is supplied entirely from the rectifier 36. If the capacitors have little voltage droop, their charging current is centered round the peak voltage, giving the composite current waveform shown in FIG. 7. In practice, however, some droop is accepted to gain economy in capacitor size, so the charging spike is spread out and the rectifier 36 conducts earlier than 30°.

Two things should be noted about the circuit of FIG. 6. Firstly the supply current is better spread than for the traditional circuit of FIG. 4, and consequently has a lower harmonic content. This leads to improved power factor. Secondly, the capacitors C1 and C2 are rated only for half the supply voltage and they supply load current only during the "valley". This permits smaller capacitors to be used and leads to an economical circuit.

In the paper by Sum cited above, it is explained that the circuit of FIG. 6 is good for improving power factor, but is only suitable for small, resistive loads that do not return energy to the supply (ibid, p. 44). As an example, Sum describes how the basic circuit can be adapted for use with fluorescent lighting loads by adding a voltage doubler. This improves the power factor further but at the expense of efficiency. This is inappropriate to a switched reluctance drive, where high efficiency of the power conditioning circuits is essential.

For switched loads (resistive or inductive) where the switching frequency is different to the mains supply frequency, the valley-fill circuit of FIG. 6 is regarded as being of little value. This is because of the presence of inductance in the supply impedance, which forces the capacitor voltage to rise whenever the current to the load is interrupted. As there is no guarantee that sufficient charge is taken out of the capacitors during the "valley fill" period, this mechanism can lead to excessive capacitor voltage and eventual capacitor failure. While the rise in capacitor voltage might be accommodated in a very small drive, increasing the capacitor size in a larger drive to overcome the problem defeats the object of achieving a low-cost, efficient circuit.

As mentioned above, a switched reluctance drive is an inductive switched load that returns energy to the supply circuit during part of each operating cycle. If operated using traditional methods of control and coupled with the circuit of FIG. 6, this returned energy adds to the previously described problem with supply inductance to further stress the capacitors. With the traditional supply circuit of FIG. 4, this is not a problem since, although the rectifier is not receptive to returned energy, the DC link capacitor is typically large enough to absorb the energy without a problem. Although the valley-fill circuit is attractive in the sense that the power factor is potentially improved, the small capacitors associated with it cannot cope with the returned energy from the machine as well as the energy from the supply inductance, as described above. There is, therefore, a need for a PFC circuit that can operate successfully with a switched reluctance drive.

SUMMARY OF THE INVENTION

It is an object of this invention to provide a cost-effective, high-power, switched reluctance drive that draws power at a high power factor from the supply.

According to one aspect of the invention, a switched reluctance drive includes a polyphase switched reluctance machine, a power factor correction circuit for improving the power factor of an AC-fed DC link, and a power converter connected to the power factor correction circuit for supplying power from the DC link to the switched reluctance machine, the power converter circuit being adapted to substantially always maintain conduction in at least one phase of the polyphase switched reluctance machine.

According to another aspect of the invention, a method of operating a switched reluctance drive having a polyphase switched reluctance machine and a power factor correction circuit for improving the power factor of an AC-fed DC link connected to a front end of the switched reluctance drive includes substantially maintaining conduction in at least one phase of the polyphase switched reluctance machine.

BRIEF DESCRIPTION OF THE DRAWINGS

The invention can be put into practice in a number of ways, some of which will now be described by way of example and with reference to the accompanying drawings in which:

FIG. 3(a) is a plot of the voltage applied to a phase winding of the drive of FIG. 1, as a function of rotor angle; FIG. 3(b) is a plot of the resulting phase current as a function of rotor angle; FIG. 3(c) is the a plot of the waveform of the current in the DC link as a function of rotor angle;

DETAILED DESCRIPTION OF PREFERRED EMBODIMENTS

Figure 6:
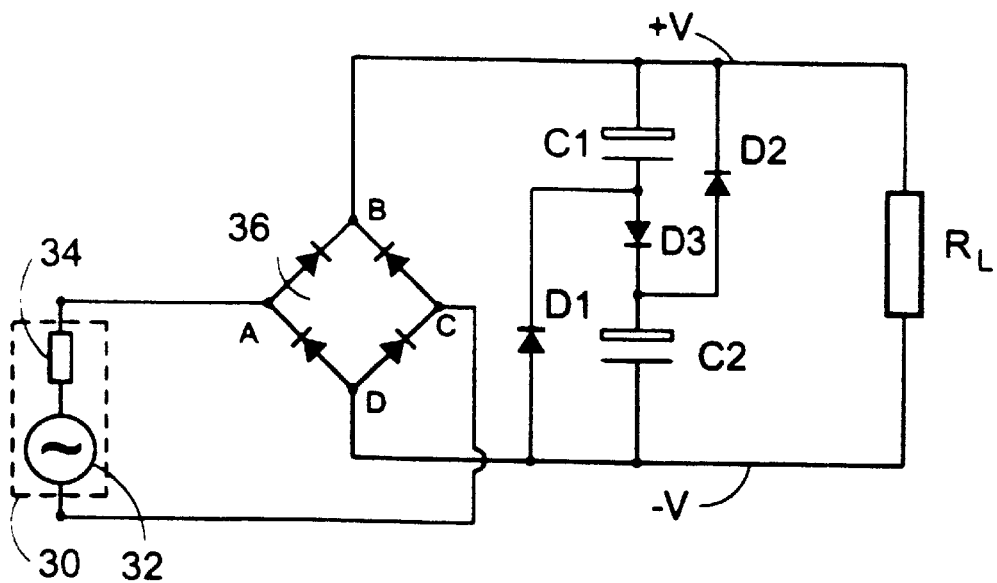
FIG. 6 is a diagram of a prior art power factor correction circuit.
Figure 7:
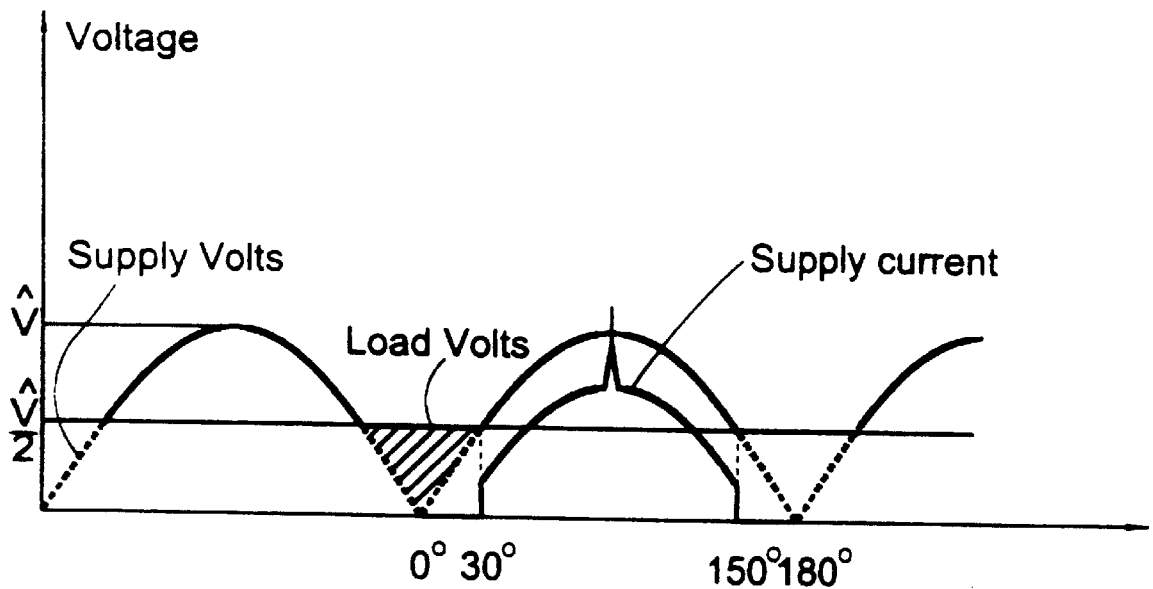
FIG. 7 shows the voltages and current of the circuit of FIG. 6.
Figure 8:
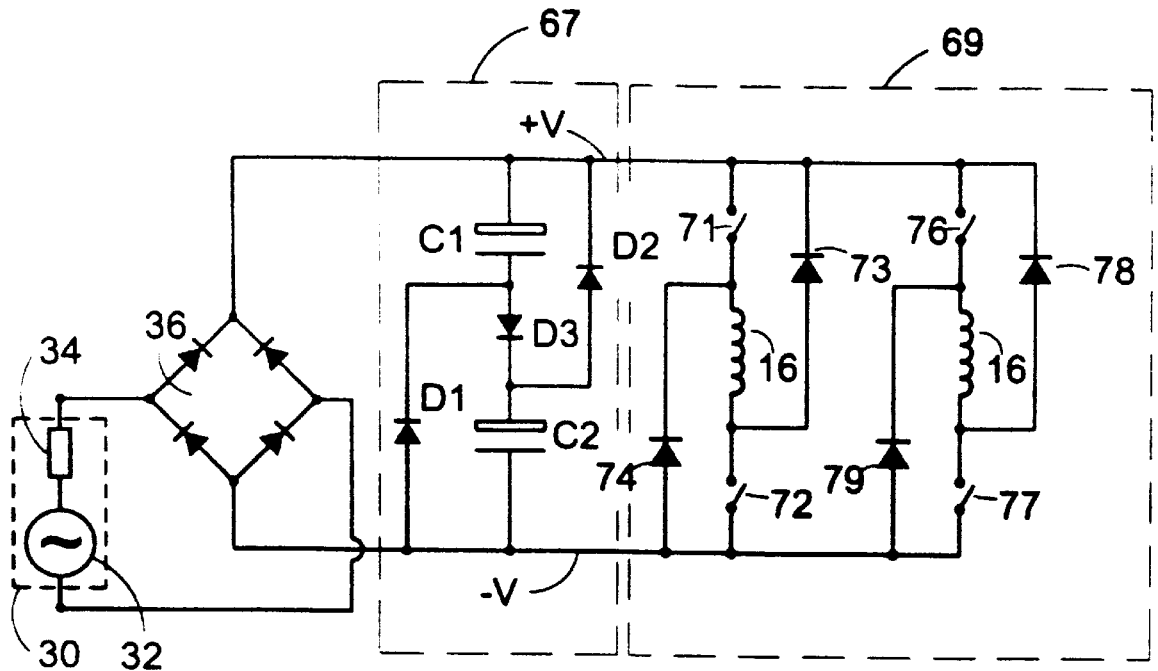
FIG. 8 is a circuit for a switched reluctance drive in which the invention is embodied.

FIG. 8 shows the valley-fill circuit 67 of FIG. 6 applied to the converter circuit 69 of a polyphase switched reluctance drive. In this case, the machine has two phases and the appropriate power switches 71, 72, 76 and 77 are connected to the windings 16 to switch them across the DC link at the appropriate times.

The usual method of operating a switched reluctance machine, as taught, for example in the Stephenson paper cited above, is to adjust the conduction angle, $\theta_c$, in FIG. 3(a), as a function of speed and load. Thus at, say, half speed the value of $\theta_c$ might be around 20% of the angular period of the excitation cycle of the phase. As the speed rises to its maximum value for the drive, the conduction angle would be increased towards a maximum value, often chosen to be around 45% of the angular period. The exact relationship is often stored in a look-up table as a function of speed. This has the effect of producing so-called "single-pulse" waveforms in the phase winding as previously shown in FIG. 3(b) and the reversing waveform as shown in FIG. 3(c). The reverse current must be absorbed by the DC link capacitor.

Figure 9:
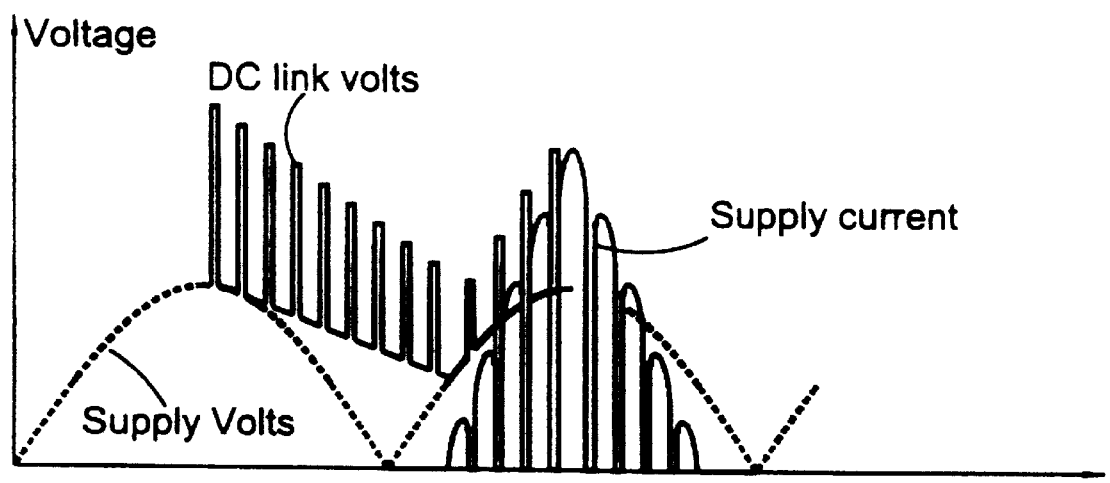
FIG. 9 is a plot of the voltages and supply current of the circuit of FIG. 8 as a function of time in one mode of operation.
Figure 10A:
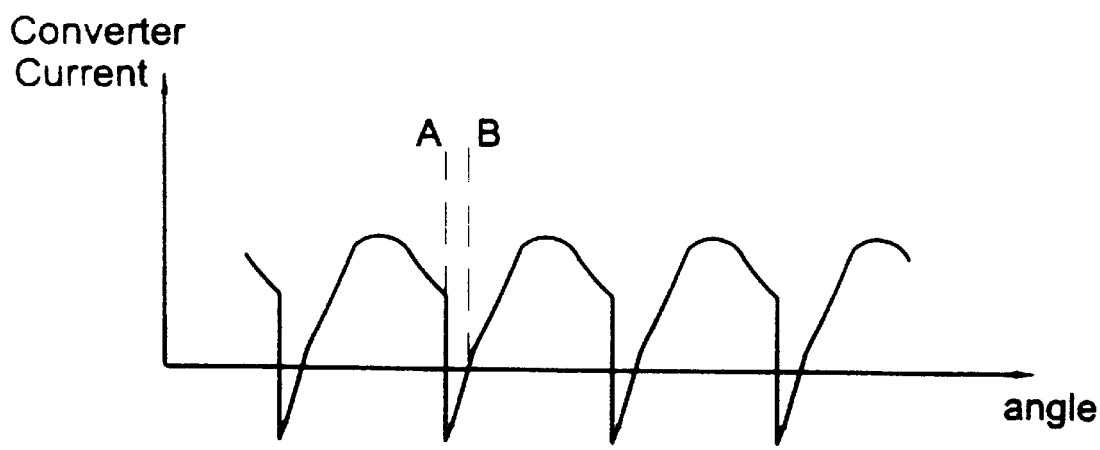
FIG. 10(a) is a plot of the currents in the DC link as a function of angle when the machine is operated according to traditional control.

The circuit of FIG. 8 provides two phases, which are switched 180O apart from each other. Each phase, when switched in the normal single-pulse mode, has a current of the general shape of FIG. 3(b). When these combine, the current in the DC link has the form shown in FIG. 10(a). This would lead to unstable operation of the circuit of FIG. 8, for two reasons. Firstly, the abrupt switching of the current from a finite value to zero at point A in the cycle would cause difficulties associated with the supply inductance. The supply current, flowing through the supply inductance, would cause a rise in voltage on the DC link. This is shown by the large voltage spikes in FIG. 9 which shows the approximate voltage appearing on the DC link. The voltage would rise until the energy stored in the supply inductor was transferred into the capacitors C1 and C2. Secondly, the reversal of current on the DC link between points A and B would cause a further, significant, increase in voltage of the capacitors as they are forced to absorb all the energy being returned from the machine. The high voltage peaks (up to twice the supply voltage peak) make the capacitor design difficult. The supply current is of the approximate form shown in FIG. 9, from which it can be seen that it has a poor power factor, having some periods at zero and many discontinuities. Note that, for clarity, FIG. 9 shows only one cycle of supply current and the corresponding variation of DC link voltage.

Figure 10B:
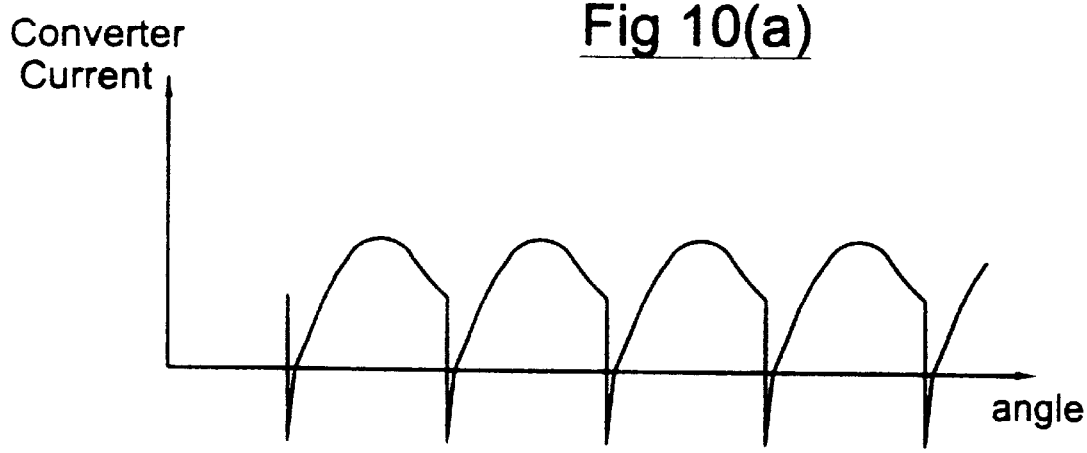
FIG. 10(b) is a plot of the current in the DC link as a function of angle when the machine is operated according to an embodiment of the invention in single-pulse mode.
Figure 11:
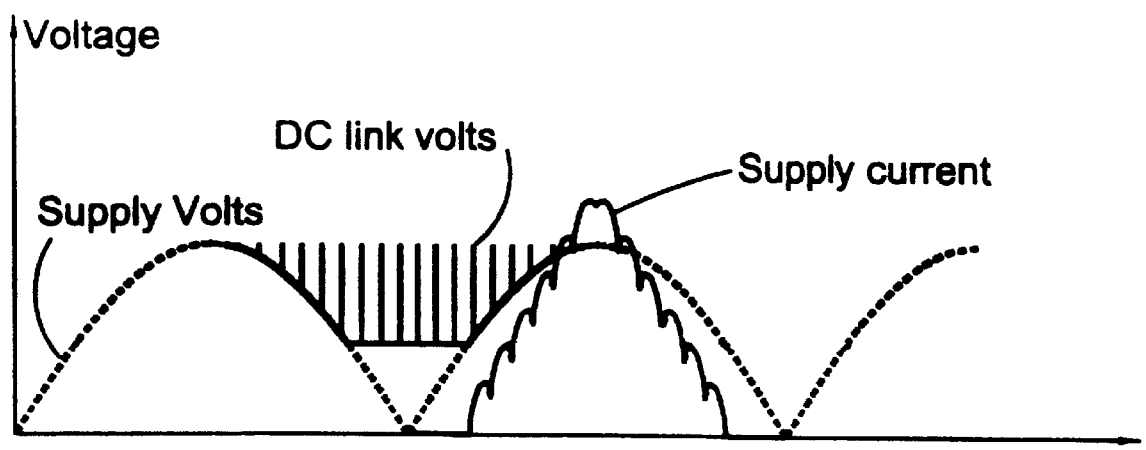
FIG. 11 shows the DC link voltage and supply current for the drive of FIG. 8 when operated according to an embodiment of the invention.

It is therefore clear that the valley-fill circuit is unsuitable for use with a switched reluctance drive operated in the traditional manner. However, if the machine is operated so that at any time there is always at least one phase switched on, that phase can help to absorb any energy associated with the supply inductance being returned by other phases. This is shown in FIG. 10(b) for a single-pulse waveform, where each phase is switched on for exactly half the cycle. Although there is still some net returned energy in the converter current, this is much smaller than in FIG. 10(a) and can usually be accommodated by the capacitors C1 and C2 without a large voltage swing. The corresponding DC link voltage and the supply current is shown in FIG. 11, where the significant improvement in supply current shape is clear when compared to FIG. 9. The power factor of the drive is substantially improved.

In summary, if the phases of the machine are switched so that there is always at least one phase drawing current from the DC link and the current drawn from the DC link is substantially always positive, then the power factor of the drive can be optimized.

This method of operation of the switched reluctance machine goes against the conventional teaching. Generally, for optimum performance and efficiency, it is considered that the machine should be operated with conduction angles that are speed and load dependent, rather than with a constant, "fully open" angle regardless of speed.

Figure 1:
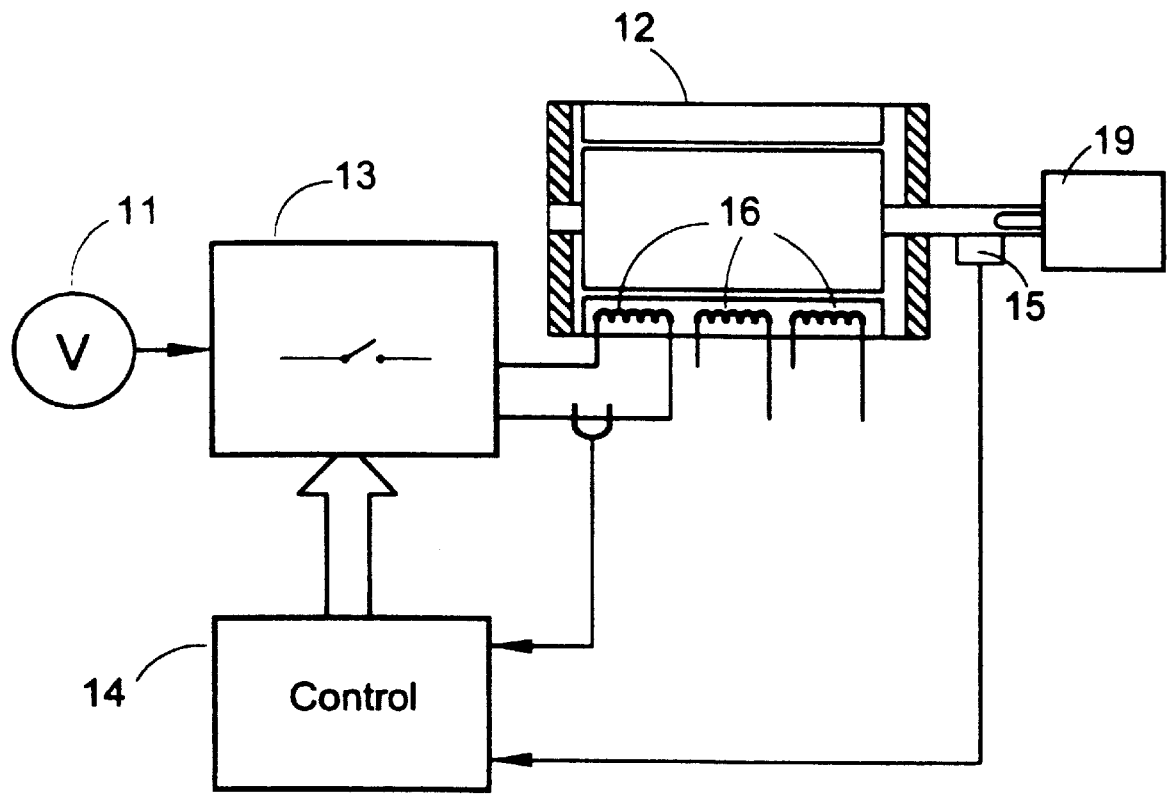
FIG. 1 is a schematic diagram of a typical prior art switched reluctance drive.
Figure 2:
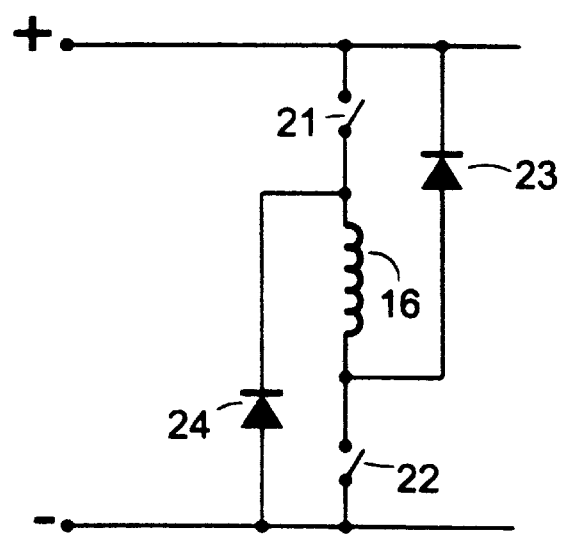
FIG. 2 is a circuit diagram of a standard switching arrangement.
Figure 4:
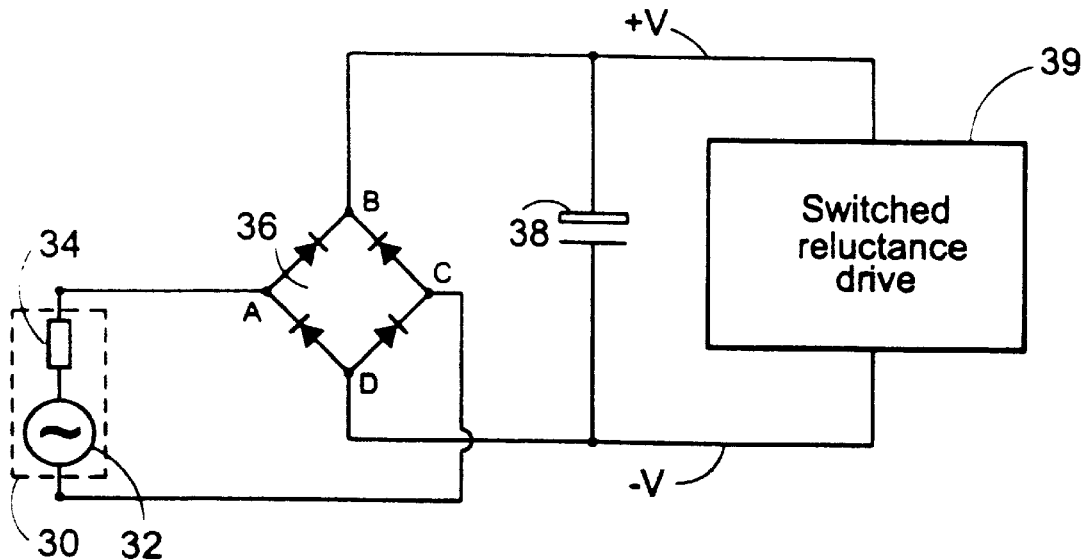
FIG. 4 is a circuit for the power supply side of a prior art switched reluctance drive.
Figure 5:
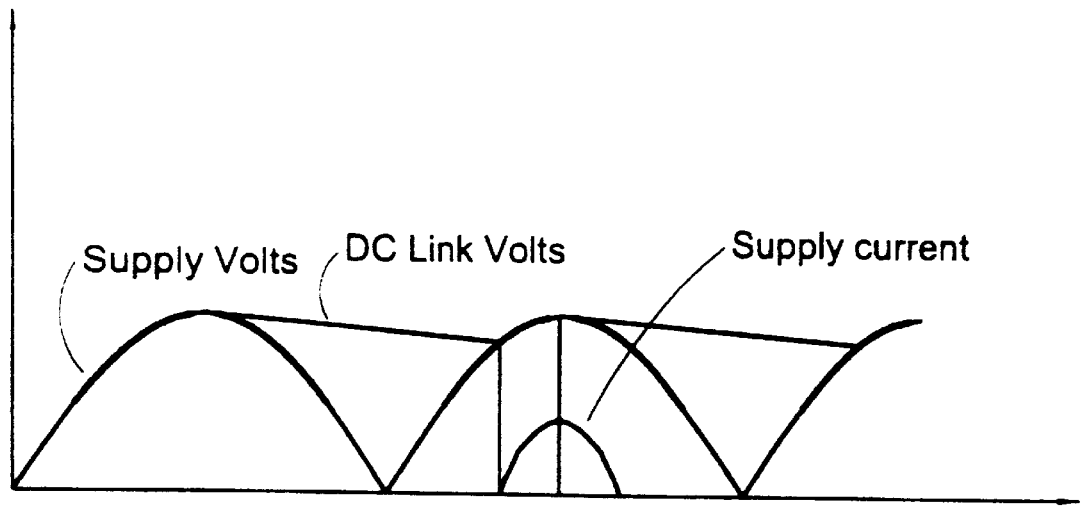
FIG. 5 is a plot of the voltage and currents of the circuit of FIG. 4 as a function of time.

Detailed operation of the circuit according to one embodiment is as follows. When the switches in the converter circuit 69 are turned off to de-energize one phase, and another phase is simultaneously switched on, the capacitors C1 and C2 are connected in series by the action of D3 being forward biased, and are charged from both the outgoing motor phase and the supply as described above. This ensures that the energy return from the machine is into a high dc link voltage. Moreover, because the other phase is simultaneously switched on, the above action ensures that the initial energization of the machine in this next phase is also from a high voltage. Both of these factors are known to be beneficial to the operation of switched reluctance machines, particularly when operating at high speed. This facility is, however, not available when the machine is connected to a standard circuit such as that shown in FIG. 4 because the DC link of FIG. 4 is substantially constant so both energy supply and energy return are associated with the same fixed voltage.

It will be appreciated that the invention is most beneficial when there are many cycles of operation of the switched reluctance drive occurring within one cycle of the mains supply (e.g. as shown in FIG. 11). This is achieved either by operating a low-pole-number machine at high speed or by operating a high-pole-number machine at lower speeds.

The single-pulse waveform of FIG. 10(b) corresponds to maximum power being drawn by the drive. The prior art method of reducing the power output of the drive would be to reduce the conduction angle. As explained above, this would cause an overvoltage of the capacitors C1 and C2 and could not be tolerated. However, the requirement to maintain conduction in at least one phase at all times can be met at lower output powers by using chopping control of the current while still maintaining a fully open conduction angle i.e. 180° electrical.

As explained in the Stephenson paper cited above, there are two principal methods of chopping. The simplest method is to simultaneously open the two switches associated with a phase winding, e.g. switches 71 and 72 in FIG. 8. This causes energy to be returned from the machine to the DC link on each "chop". This is sometimes known as "hard chopping". The alternative method is to open only one of the switches, e.g. 71, allowing the current to circulate or freewheel around the loop formed by the winding 16, the other switch 72 and the diode 74. This is known as "freewheel chopping" or "soft chopping". In this mode of control, no energy is returned to the DC link until the end of each phase period.

Figure 10C:
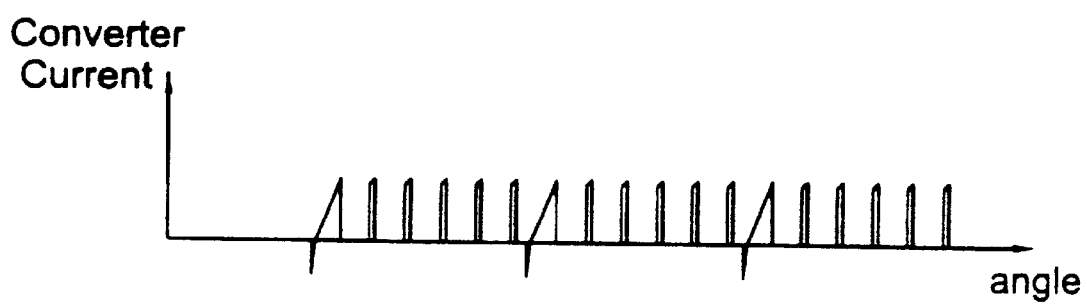
FIG. 10(c) is a plot of the current in the DC link as a function of angle when the machine is operated according to an embodiment of the invention in chopping mode.

FIG. 10(c) shows a typical converter current in a soft chopping mode of control, where five chopping cycles are used in a single conduction cycle. The returned current is very small and is easily handled by the capacitors Cl and C2. While this method of chopping control is detrimental to the overall power factor of the drive (because the supply current is significantly discontinuous), the mode is only used at low powers, where the limit on absolute current level is not generally of concern.

From the foregoing description, it has been shown that a control scheme can be implemented for a switched reluctance drive that allows the circuit shown in FIG. 8 to be operated such that its power factor is a maximum at maximum power output from the drive. In practice, a power factor above 0.9 is achievable, allowing a 1650 W appliance to be operated from a 120V 15 A supply. Operation at lower power (albeit with reduced power factor) can also be achieved within the supply current limit.

The illustrative embodiment described above uses a two-phase switched reluctance drive, but any higher phase number could also be used, since the increased number of phases makes it easier to ensure that there is always a net current drawn from the DC link.

The skilled person will appreciate that variations of the disclosed arrangements are possible without departing from the invention. Accordingly, the above description is made by way of example and not for the purposes of limitation. It will be clear to the skilled person that minor modifications can be made to the converter circuit or other aspects of the invention without significant changes to the operation described above.

What is claimed is:

1. A switched reluctance drive comprising:
   (a) a polyphase switched reluctance machine,
   (b) a power factor correction circuit for improving the power factor of an AC-fed DC link, and
   (c) a power converter connected to the power factor collection circuit for supplying power from the DC link to the switched reluctance machine,
wherein said power factor correction circuit comprises a first capacitor connected between a positive supply line of the DC link and an anode of a first diode and a second capacitor that is connected between a negative supply line of the DC link and a cathode of the first diode, wherein between the first capacitor and the first diode is connected a cathode of a second diode, the anode of which second diode is connected to the negative line of the DC link and between the second capacitor and the first diode is the anode of a third diode, the cathode of which third diode is connected to the positive line of the DC link, and the power converter circuit is adapted to substantially always maintain conduction in at least one phase of the polyphase switched reluctance machine.

2. A switched reluctance drive as claimed in claim 1, wherein the power factor correction circuit is passive.

3. A switched reluctance drive as claimed in claim 1, wherein the power converter is adapted to chop the current supplied to the polyphase switched reluctance machine.

4. A switched reluctance drive as claimed in claim 1, wherein the polyphase switched reluctance machine is a linear polyphase switched reluctance machine.

5. A switched reluctance drive as claimed in claim 1, wherein the polyphase switched reluctance machine is a rotary polyphase switched reluctance machine.

6. A switched reluctance drive as claimed in claim 1, wherein the machine is a two-phase machine.

7. A method of operating a switched reluctance drive having a polyphase switched reluctance machine and a power factor correction circuit for improving the power factor of an AC-fed DC link connected to a front end of the switched reluctance drive, wherein said power factor correction circuit comprises a first capacitor connected between a positive supply line of the DC link and an anode of a first diode and a second capacitor that is connected between a negative supply line of the DC link and a cathode of the first diode, wherein between the first capacitor and the first diode is connected a cathode of a second diode, the anode of which second diode is connected to the negative line of the DC link and between the second capacitor and the first diode is the anode of a third diode, the cathode of which third diode is connected to the positive line of the DC link, said method comprising:
   substantially maintaining conduction in at least one phase of the polyphase switched reluctance machine.

8. A method as claimed in claim 7 comprising chopping the current applied to the polyphase switched reluctance machine.

9. A method as claimed in claim 7, wherein the power factor correction circuit is passive.

10. A method as claimed in claim 8, wherein the power factor correction circuit is passive.

11. A switched reluctance drive comprising:
(a) a polyphase switched reluctance machine,
(b) means for improving the power factor of an AC-fed DC link, and
(c) means, connected to the means for improving power factor, for supplying power from the DC link to the switched reluctance machine, wherein said means for improving the power factor comprises a first capacitor connected between a positive supply line of the DC link and an anode of a first diode and a second capacitor that is connected between a negative supply line of the DC link and a cathode of the first diode, wherein between the first capacitor and the first diode is connected a cathode of a second diode, the anode of which second diode is connected to the negative line of the DC link and between the second capacitor and the first diode is the anode of a third diode, the cathode of which third diode is connected to the positive line of the DC link, and the converting means is adapted to substantially always maintain conduction in at least one phase of the polyphase switched reluctance machine.

12. A switched reluctance drive as claimed in claim 11, wherein the means for improving power factor is passive.

13. A switched reluctance drive as claimed in claim 11, wherein the machine is a two-phase machine.

* * * * *

UNITED STATES PATENT AND TRADEMARK OFFICE
CERTIFICATE OF CORRECTION

PATENT NO. : 6,201,368 B1
DATED : March 13, 2001
INVENTOR(S) : Paul D. Webster

Page 1 of 1

It is certified that error appears in the above-identified patent and that said Letters Patent is hereby corrected as shown below:

<u>Column 3,</u>
Line 56, "R1" has been changed to -- $R_L$ --.

<u>Column 6,</u>
Line 11, "1800" has been change to -- 180° --.

<u>Column 8,</u>
Line 15, "collection" has been changed to -- correction --.

<u>Column 9,</u>
Line 5, "(c) means" has been changed to -- (c) converting means --.

Signed and Sealed this

Twenty-fifth Day of September, 2001

Attest:

*Nicholas P. Godici*

NICHOLAS P. GODICI
*Attesting Officer*    *Acting Director of the United States Patent and Trademark Office*